United States Patent [19]

Matsumoto et al.

[11] Patent Number: 4,623,940
[45] Date of Patent: Nov. 18, 1986

[54] MAGNETIC REPRODUCING APPARATUS

[75] Inventors: Tokikazu Matsumoto, Osaka; Masahiro Honjo, Neyagawa; Masaaki Kobayashi, Kawanishi, all of Japan

[73] Assignee: Matsushita Electric Industrial Co., Ltd., Osaka, Japan

[21] Appl. No.: 525,567

[22] Filed: Aug. 22, 1983

[30] Foreign Application Priority Data

Aug. 24, 1982 [JP] Japan .................. 57-147106

[51] Int. Cl.[4] .................. H04N 5/783; H04N 5/95
[52] U.S. Cl. .................. 360/10.3; 360/64; 360/36.2; 358/312; 358/339
[58] Field of Search .................. 360/10.3, 10.2, 10.1, 360/64, 21, 36.1, 36.2; 358/337, 312, 325, 327, 339

[56] References Cited

U.S. PATENT DOCUMENTS

| | | | |
|---|---|---|---|
| 3,763,317 | 10/1973 | Coleman | 358/339 |
| 4,074,307 | 2/1978 | Dischert | 358/337 |
| 4,118,738 | 10/1978 | Ornstein | 360/36.2 |
| 4,197,562 | 4/1980 | Kikuya et al. | 360/64 |
| 4,228,460 | 10/1980 | Rotter | 358/337 |
| 4,291,344 | 9/1981 | Kimura | 360/36.1 |
| 4,313,129 | 1/1982 | Fukui | 358/325 |
| 4,426,666 | 1/1984 | Kobayashi | 360/64 |
| 4,456,932 | 6/1984 | Honjo | 360/10.3 |

FOREIGN PATENT DOCUMENTS

| | | |
|---|---|---|
| 0038217 | 10/1981 | European Pat. Off. . |
| 0049989 | 4/1982 | European Pat. Off. . |
| 3234153 | 4/1983 | Fed. Rep. of Germany . |

Primary Examiner—Alan Faber
Attorney, Agent, or Firm—Wenderoth, Lind & Ponack

[57] ABSTRACT

A magnetic reproducing apparatus which has a pair of main rotatable heads having different azimuth angles and a pair of auxiliary rotatable heads having different azimuth angles. When a magnetic tape is played back while it runs at a speed different from that at which it runs during a recording mode, playback output signals from the main and auxiliary rotatable heads are switched over to replace a reduction in the outputs from the main rotatable heads with the outputs from the auxiliary rotatable heads to produce a combined playback output signal. The combined playback output signal is passed through a variable delay line having a delay time varied by an output from a detector circuit which detects variations in horizontal synchronous signal intervals of the combined playback output signal. This varied delay time of the variable delay line can eliminate any skew distortions which would appear on a displayed image on the screen due to the variations in horizontal synchronous signal intervals of the combined playback output signal.

11 Claims, 12 Drawing Figures

MAGNETIC REPRODUCING APPARATUS

BACKGROUND OF THE INVENTION

1. Field of the Invention

The present invention relates to a magnetic reproducing apparatus capable of reproducing recorded information in special modes at variable speeds, such as video tape recorders having rotatable heads for recording video information with appropriate azimuth angles.

2. Description of the Prior Art

There has been an increasing demand in recent years for magnetic video signal recording and reproducing apparatus utilizing a magnetic tape as a recording medium, such as video tape recorders, to have special playback modes for reproducing the video signals at speeds different from those at which the video signals have been recorded. For still and slow-motion playback modes, a method has already been proposed to control the magnetic tape to run so that lowered playback head outputs will be synchronized with vertical flyback or retrace periods. This allows the video signals to be reproduced in the still and slow-motion playback modes without noise bars. For a high-speed playback mode or a high-speed reverse playback mode, it has been proposed to shift rotatable heads so as to follow magnetic tracks being reproduced. This arrangement however results in a large and costly construction. It has also been proposed to use auxiliary rotatable heads to thereby compensate for a reduction in the output from main rotatable heads. The proposed auxiliary heads are disadvantageous in that skew distortions will be produced when the heads are switched over. No satisfactory achievements have heretofore been made for reproducing video images free from noise bars and skew distortions with a simple arrangement.

SUMMARY OF THE INVENTION

It is an object of the present invention to provide a magnetic reproducing apparatus capable of reproducing recorded information without noise bars and skew distortions in high-speed and high-speed reverse playback modes as well as still and slow-motion playback modes.

Another object of the present invention is to provide a magnetic reproducing apparatus having main rotatable heads and auxiliary rotatable heads attached closely to the main rotatable heads, the arrangement being such that reductions in the level of output playback signals from the main rotatable heads can be compensated for by switching over to output playback signals from the auxiliary rotatable heads, and any skew distortions generated at that time will be removed by employing a variable delay line.

Still another object of the present invention is to provide a magnetic reproducing apparatus in which any influences due to nonlinear characteristics of a skew corrector circuit can be removed by detecting and eliminating variations in the intervals of horizontal synchronous signals having passed through a variable delay line with a feedback loop.

According to the present invention, the above objects can be achieved by a magnetic reproducing apparatus comprising: a pair of main rotatable heads having different azimuth angles; a pair of auxiliary rotatable heads having different azimuth angles and attached in different positions from those of the main rotatable heads; switching timing control means for controlling timing of switching between playback output signals from the main and auxiliary rotatable heads when a magnetic tape runs in a playback mode at a speed different from that at which the magnetic tape runs in a recording mode; switching means responsive to an output signal from the switching timing control means for replacing the playback output signals from the main rotatable heads with the playback output signals from the auxiliary rotatable heads to thereby produce a combined playback output signal; a variable delay line for passing the combined playback output signal therethrough; detector means for detecting the period of a reproduced horizontal synchronous signal when the combined playback output signal passes through the variable delay line; and delay time control means responsive to an output from the detector circuit for varying a delay time of the variable delay line to remove any skew generated when the playback output signals from the main rotatable heads are replaced with the playback output signals from the auxiliary rotatable heads.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
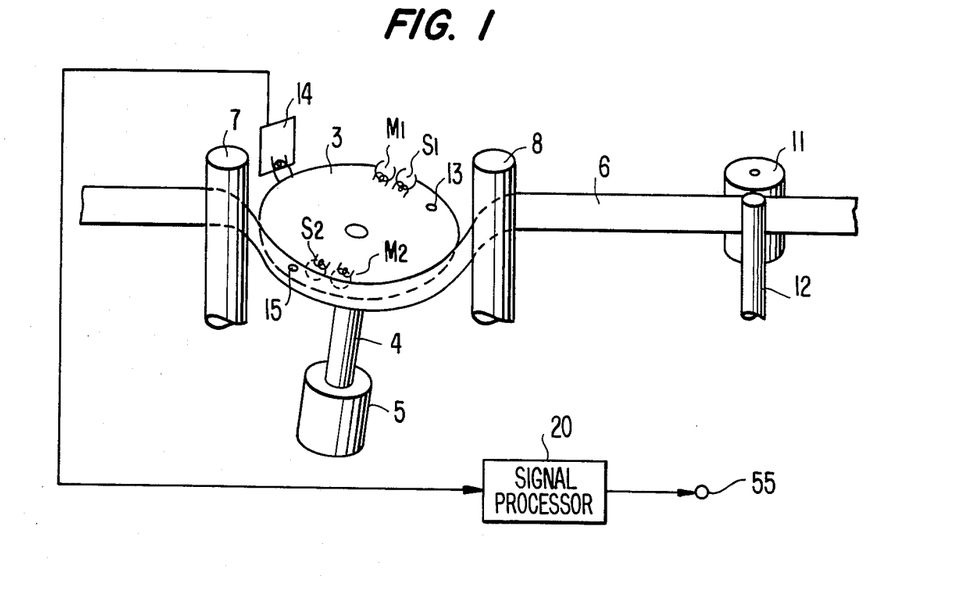
FIG. 1 is a schematic diagram showing a head drum arrangement according to the present invention.

As shown in FIG. 1, a rotatable head drum (or disk) 3 supports thereon a main rotatable head M1 having an azimuth angle of +6°, an auxiliary rotatable head S1 having an azimuth angle of −6° and located closely to the main rotatable head M1, another main rotatable head M2 having an azimuth angle of −6°, and another auxiliary rotatable head S2 having an azimuth angle of +6° and located closely to the main rotatable head M2.

The main rotatable heads M1, M2 are diametrically opposed or angularly spaced from each other through 180°. Each main rotatable head is spaced from the associated auxiliary head by a distance corresponding to two horizontal synchronous signal periods. The rotatable disk 3 is rotated through a rotatable shaft 4 by a motor 5 in the direction of the arrow 9 at 1,800 r.p.m. The phase of rotation of the rotatable drum 3 is detected by magnets 13, 15 and a detector head 14. A magnetic tape 6 is guided by a pair of guide posts 7, 8 to be held in contact with a peripheal surface of the rotatable drum 3 through an angle of 180° or larger, and is caused to run by a pinch roller 1 and a capstan roller 12. The detector head 14 produces a pulse when each of the magnets 13 and 15 passes near the detector head 14. A signal processor 20 produces a signal which high level in on field and low level in the next field by inverting its output signal level according to the pulse from the detector head 14. The output signal of the signal processor 20 is called the "head switch signal" (which is appeared at a terminal 55).

Figure 2:
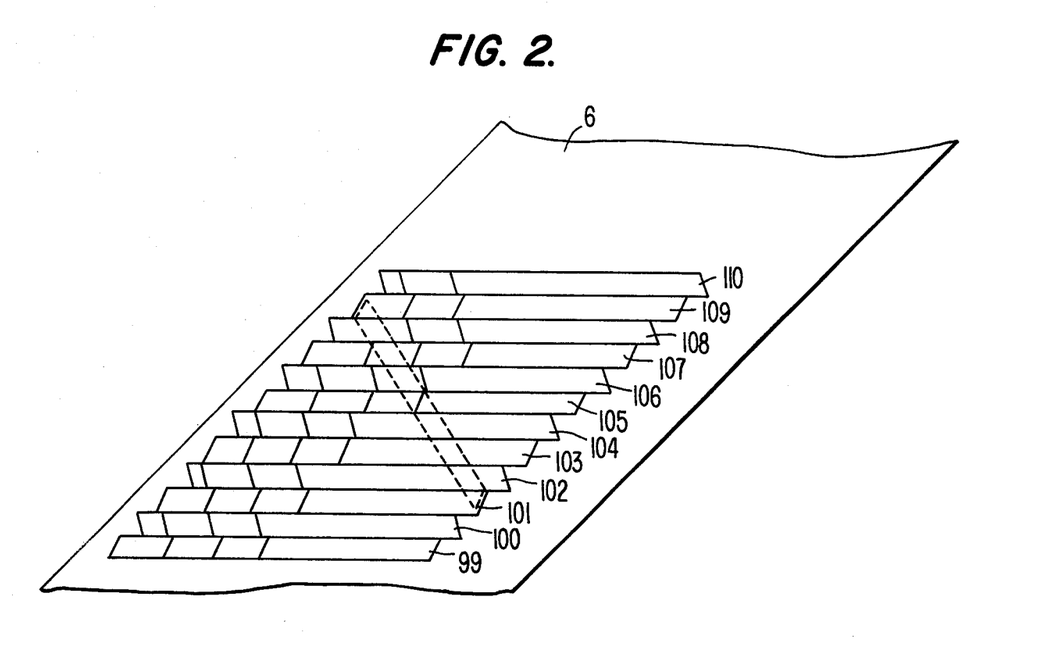
FIG. 2 is a diagram showing a track pattern recorded on a magnetic tape with heads having azimuth angles.

FIG. 2 shows a typical track pattern recorded on a magnetic tape 6. Tracks 99, 101, 103, 105, 107, 109 are recorded by the rotatable heads having the azimuth of +6°, and tracks 100, 102, 104, 106, 108 are recorded by the rotatable heads having the azimuth of −6°.

Horizontal synchronous signals are recorded at positions indicated by slant lines in each recorded track illustrated in FIG. 2, the slant lines being inclined at the azimuth angles. (Such slant lines are omitted from illustration in a righthand transverse half of the magnetic tape 6.) The slant lines in any two adjacent tracks are shifted from each other due to the fact that the recorded horizontal signals in such adjacent tracks are out of phase because of cylinder or head drum jitter.

Figure 3:
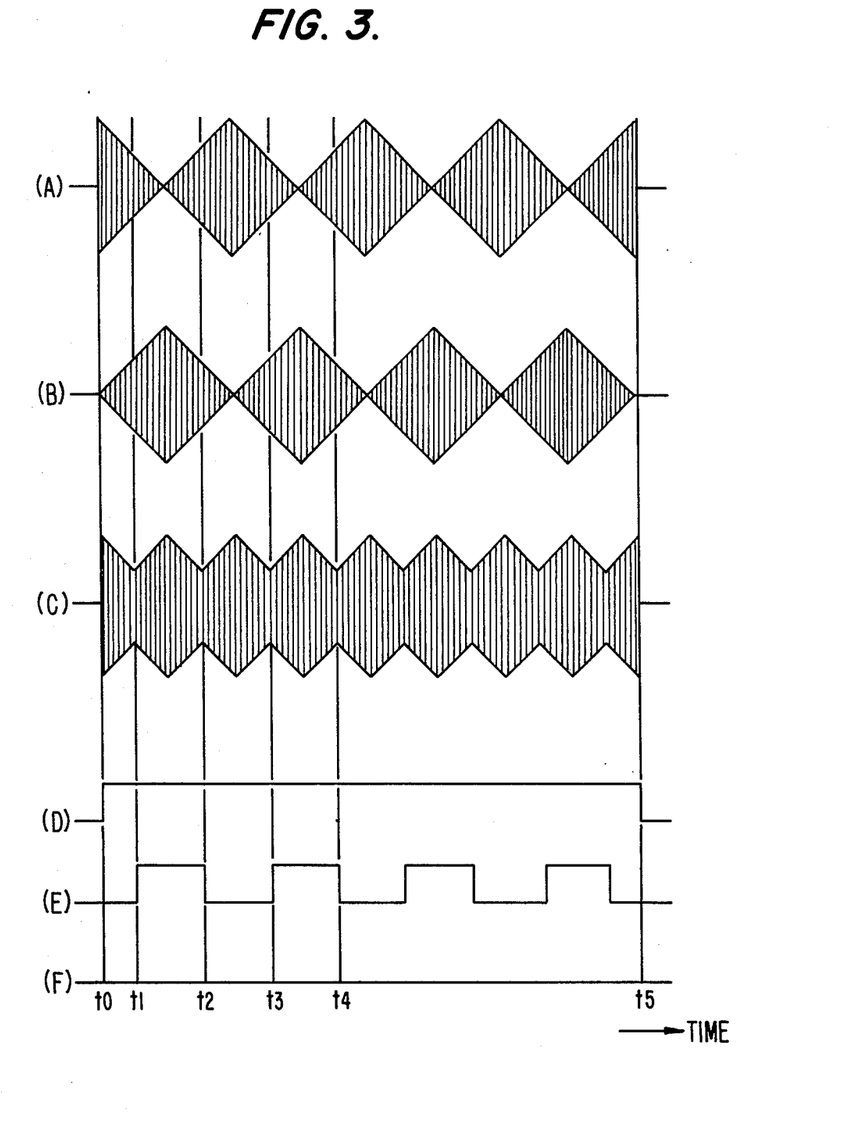
FIGS. 3(A) through 3(F) are timing charts of signals generated in a magnetic reproducing apparatus according to the present invention.

The track pattern of FIG. 2 indicates a track pattern when the magnetic tape 6 is running at a normal speed, that is, at the same speed as that at which the magnetic tape 6 is recorded. Assuming in the normal-speed reproducing mode that the main rotatable head M1 scans a starting point on the track 101 at the beginning of a field, the main rotatable head M1 scans an ending point on the track 101 at the end of the same field. Assuming in a ninefold-speed reproducing mode that the main rotatable head M1 scans the starting point on the track 101 at the beginning of a field, the same head scans an ending point on the track 109 at the end of that field. The auxialiary rotatable head S1 rotates in the same plane as the main rotatable head M1 and is disposed adjacent to the main rotatable head M1, the head S1 being spaced from the head M1 by the distance equal to two horizontal synchronous signal periods. Accordingly, the auxiliary rotatable head S1 scans the track or tracks in substantially the same manner as that of the main rotatable head M1. In such a ninefold-speed playback mode, the main rotatable head M1 produces an output signal as shown in FIG. 3(A) since the head M1 has the azimuth +6°. In the same playback mode, the auxiliary rotatable head S1 generates an output signal as shown in FIG. 3(B) since the head S1 has the azimuth −6°. These head output signals are normally composed of a luminance signal frequency-modulated with a carrier frequency of about 3.9 MHz and a carrier chrominance signal with a chrominance subcarrier frequency converted into a low frequency range of about 629 kHz. FIG. 3(F) illustrates a time scale with a field beginning time indicated by t0 and a field end time by t5. In the high-speed playback mode as illustrated in FIG. 3(A), there are several noize bars in one field which are in synchronism with zero head output signals. These noise bars can be removed by replacing low-level portions of the reproduced output signals from the main rotatable head M1 with the reproduced output signals from the auxiliary rotatable head S1 as shown in FIG. 3(B).

Figure 4:
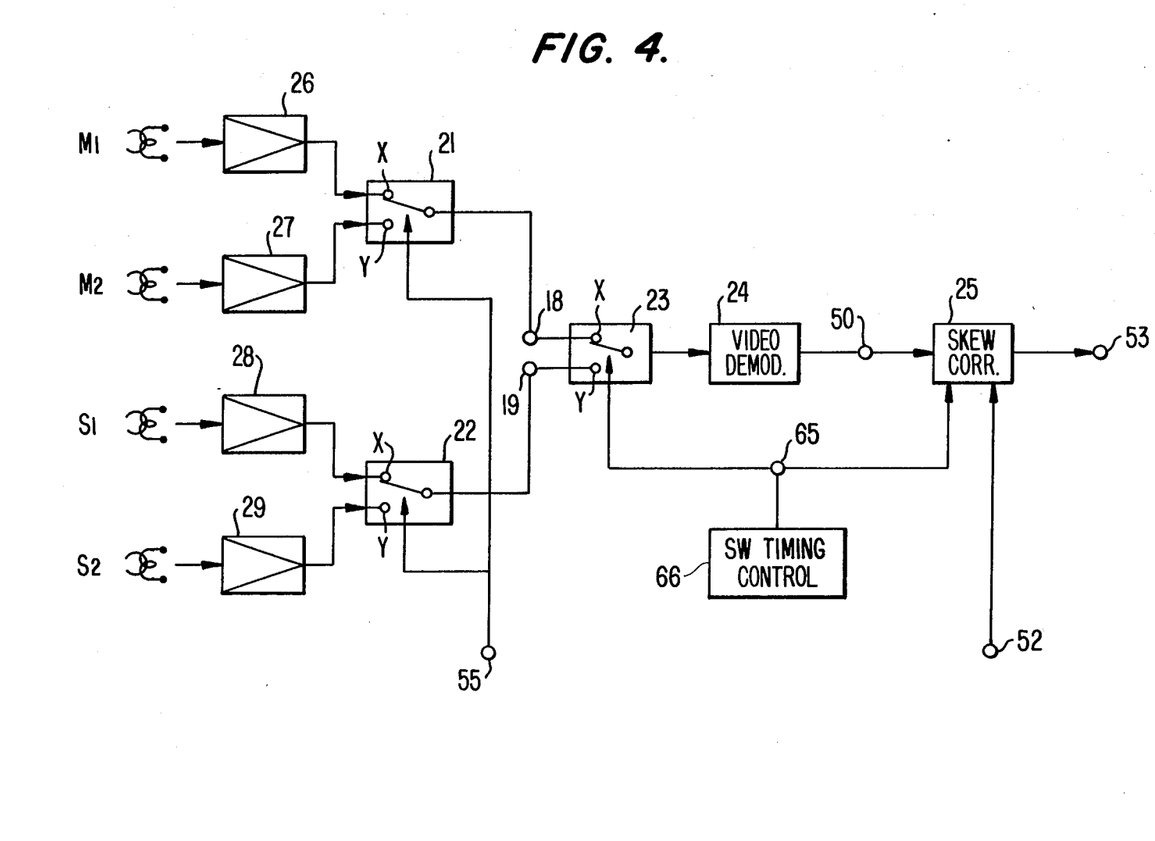
FIG. 4 is a block diagram of a magnetic reproducing apparatus according to an embodiment of the present invention.

In the ninefold-speed playback mode, for example, the main rotatable heads M1, M2 and the auxiliary rotatable heads S1, S2 can be switched over in the following manner. The reproduced video signals from the main rotatable heads M1, M2 are amplified by amplifiers 26, 27 and applied to contacts X, Y of a switch 21, respectively. The reproduced video signals from the auxiliary rotatable heads S1, S2 are amplified by amplifiers 28, 29 and applied to contacts X, Y of a switch 22, respectively. As shown in FIG. 4, switches 21, 22 have movable contacts shifted to contacts X when the head switch signal is of a high level as shown in FIG. 3(D) and to contacts Y when the head switch signal is of a low level. The head switch signal is obtained by processing, in a signal processor 20 (FIG. 1), output signals generated from the detector head 14 by the magnets 13, 15, which are angularly spaced from each other by 180°. The head switch signal is high level in one field and of a low level in the next field. The signal processor 20 comprises, for example, a Schmitt trigger circuit and a T flip-flop.

The magnets 13, 15 have different polarities and are capable of detecting the phase of rotation of the rotatable head drum each time it rotates through 180° so that they can distinguish one field from the other.

If the head switch signal is high level, then the main and auxiliary rotatable heads M1 and S1 produce the playback output signals as shown in FIGS. 3(A) and (B), respectively. Likewise, if the head switch signal is low level, then the main and auxiliary rotatable heads M2 and S2 produce the playback signals as shown in FIGS. 3(A) and (B), respectively. These playback output signals are applied to a switch 23. The switch 23 has a movable contact shifted to a contact Y when an output signal applied from a switching timing control means 66 to a terminal 55 is high level, and to a contact X when the output signal from the switching timing control means 66 is low level. By applying a main-auxiliary head switching signal as shown in FIG. 3(E) to the terminal 55, the switch 23 produces at its output terminal a playback output signal as illustrated in FIG. 3(C).

Figure 5:
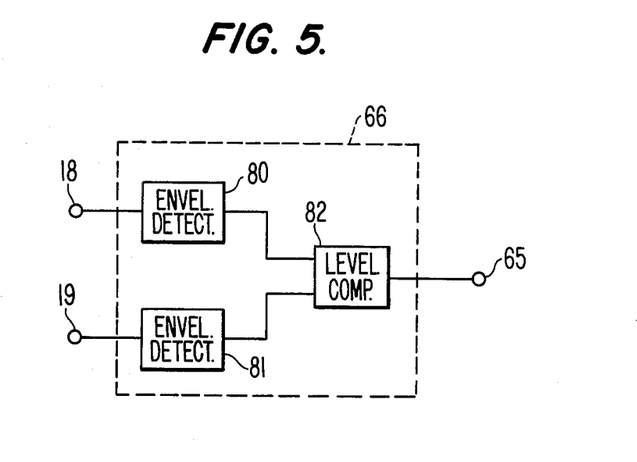
FIG. 5 is a block diagram of a switching timing control circuit that can be utilized in the present invention.

FIG. 5 shows an embodiment of the switching timing control means 66. The playback output signals applied from the main and auxiliary rotatable heads to terminals 18, 19 are supplied to envelope detectors 80, 81 which detects envelopes of the playback output signals. The envelope signals as detected are compared in level by a level detector 82. The head switching signal as shown in FIG. 3(E) can be obtained by arranging the switching timing control means 66 such that the level comparator 82 generates a high-level output when the level of the playback output signal from the main rotatable head as shown in FIG. 3(A) is lower than that of the playback output signal from the auxiliary rotatable head as shown in FIG. 3(B), and a low-level output when the output from the main head is higher in level than that from the auxiliary head.

Another embodiment of the switching time control means 66 will be described below (not shown in the drawings).

Since the levels of the playback output signal in high-speed playback modes vary cyclically as shown in FIGS. 3(A) and (B), they can be determined from the phase of rotation of the rotatable head. Therefore, the head switching signal shown in FIG. 3(E) can be derived from the phase of rotation of the rotatable head drum.

The playback output signal thus produced at the output terminal of the switch 23 is applied to a video signal demodulator 24 (FIG. 4) which issues as an output a video signal reproduced at the ninefold speed and free from noise bars. If this video signal were played back directly on the display screen, horizontal synchronous intervals of the reproduced video signal would be varied and skew distortions would appear on the screen at the time of changing over the main rotatable heads M1, M2 and the auxiliary rotatable heads S1, S2 since the horizontal synchronous signals recorded on any adjacent tracks are out of phase as shown in FIG. 2. The undesirable skew distortions can be eliminated by a skew corrector 25 illustrated in FIG. 4.

Skew distortion correction will now be described with reference to FIGS. 6 and 7.

Since skew distortions are produced when horizontal synchronous signal intervals are varied, they can be removed by passing playback output signals through delay lines and changing over delay times to correct the intervals. To this end, it is necessary to detect variations in the intervals and provide an error signal indicative of such variations. The error signal can be generated by a detector 72 composed of a phase comparator 47, a low-pass filter 43, and a voltage-controlled oscillator 42 (hereinafter referred to as "VCO").

More specifically, the reproduced video signal is applied from a terminal 75 to a horizontal synchronous signal separator 37 which issues a horizontal synchronous signal to the phase comparator 47, in which the horizontal synchronous signal is compared in level with an output from the VCO 42. Any phase difference appears as an error signal voltage at an output terminal of the phase comparator 47. The output from the phase comparator 47 serves to control the oscillation frequency of the VCO 42 through the low-pass filter 43. The error signal voltage has a waveform as shown in FIG. 7(A), for example, and any error information is given as peak values as shown in FIG. 7(A).

The error signal voltage thus obtained is then applied to an arithmetic circuit 60 composed of sample and hold circuits 50, 51 which are connected in series for producing a signal which energizes another VCO 70. Operation of the arithmetic circuit 60 will now be described.

A CCD (charge-coupled device) delay line 30 is controlled by the VCO 70 to increase or reduce its delay time in response to the error signal voltage produced by the phase comparator 47 at the time of changing over the main rotatable heads M1, M2 and the auxiliary rotatable heads S1, S2. The arithmetic circuit 60 is therefore required to effect arithmetic operations by adding a peak value of the error signal voltage to the output from the arithmetic circuit 60 immediately prior to the generation of the error signal voltage and issuing the sum as a new signal. To carry out this, the arithmetic circuit 60 actually operates as follows:

The error signal voltage from the output terminal of the phase comparator 47 is added to the output from the sample and hold circuit 51, and the sum signal is stored in the sample and hold circuit 50 in response to a sampling pulse generated by a timing signal generator 39. At this time, no sampling pulse is applied to the sample and hold circuit 51 so that the output from the sample and hold circuit 51 remains unchanged. Then, a sampling pulse is issued from the timing signal generator 39 to the sample and hold circuit 51 to enable the sample and hold circuit 51 to store and issue the output from the sample and hold circuit 50. In this manner, the error signal voltage is successively accumulated and issued from the sample and hold circuit 51. The signal as shown in FIG. 7(B) is obtained at the output terminal of the sample and hold circuit 51. The two sample and hold circuits 50, 51 are reset by a vertical synchronous signal delivered from an input terminal 52 so as to be prevented from being saturated due to the accumulation of the error signal voltage.

The output from the arithemtic circuit 60 is then applied to the VCO 70 to change the oscillation frequency thereof. The output from the VCO 70 serves to change the delay time of the CCD delay line 30 for thereby taking the horizontal synchronous intervals of the reproduced video signal into synchronism with each other.

The timing signal generator 39 may comprise a monostable multivibrator, for example. The sampling pulse given to the sample and hold circuits 50, 51 is obtained by delaying the horizontal synchronous signal for a certain period of time. The timing signal generator 39 also generates a pulse for switching on a 1H delay line 32 by delaying the output from the switching timing control means 66 for a certain interval of time. Therefore, the timing signal generator 39 is supplied with the horizontal synchronous signal and the output from the switching timing control means 66, and delays these supplied signals with the monostable multivibrator for the required interval of time to thereby produce desired pulses.

The variations in the intervals of the horizontal synchronous signals are detected and these intervals are brought into synchronism by the delay line in the foregoing manner. However, a certain processing time elapses after the interval variation has been detected and before the delay time of the delay line is changed. Since the signal during that period of time is not corrected as to the horizontal synchronous signal interval, this signal is replaced with a signal one horizontal synchronous signal (hereinafter referred to as "1H") prior thereto in the following manner. During the correction processing, the timing signal generator 39 issues a high-level signal to a switch 33 (FIG. 6) to shift its movable contact to a contact X. As a consequence, the signal having passed through the 1H delay line 32, that is, a signal which is 1H prior thereto is employed at an output terminal 53 as the playback output during the correction processing. While the 1H delay line 32 is used in the illustrated embodiment, an nH delay line (n is an integer) may be used in the case where the correction processing takes a longer period of time than 1H.

Accordingly, reproduced images on the screen are immune to noise bars in high-speed playback modes and free from skew distortions at the time of switching between the main and auxiliary rotatable heads.

In a reverse high-speed reproduction mode, the main and auxiliary rotatable heads M1, M2, S1, S2 scan the magnetic tape 6 in a pattern different from that described above. However, output signals in this mode have substantially the same relation as that between the output signals from the main and auxiliary rotatable heads S1, S2 (that is, the times at which maximum output levels are produced are substantially the same as those at which minimum output levels are generated), and therefore the circuit arrangement as shown in FIG. 4 can be utilized to provide the same advantages as those in the high-speed playback mode described above.

Figure 8:
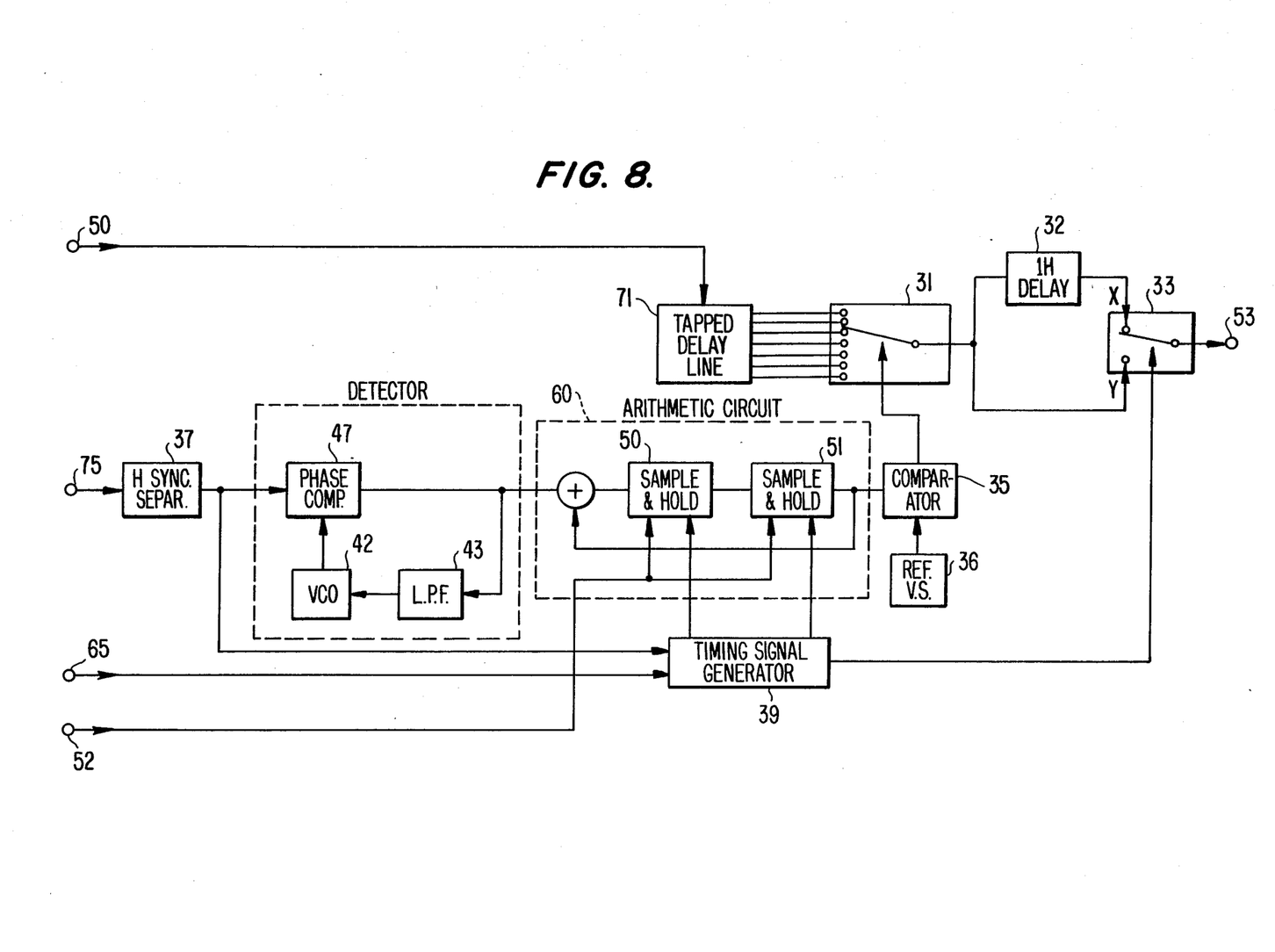
FIG. 8 is a block diagram of another skew corrector circuit which can be used in the present invention.

While in the foregoing embodiment the CCD delay line is used as a means for varying a delay time, it may be replaced with a tapped delay line 71, as shown in FIG. 8, and the VCO 70 may be replaced with a comparator 35 for comparing the output from the arithmetic circuit 60 with a reference voltage generated by a reference voltage source 36 and a switch means 31 actuatable by an output from the comparator 35 for changing over the taps of the tapped delay line 71. This arrangement is also capable of easy skew correction. Identical or corresponding parts shown in FIG. 8 are denoted by identical or corresponding reference characters in FIG. 6.

Figure 6:
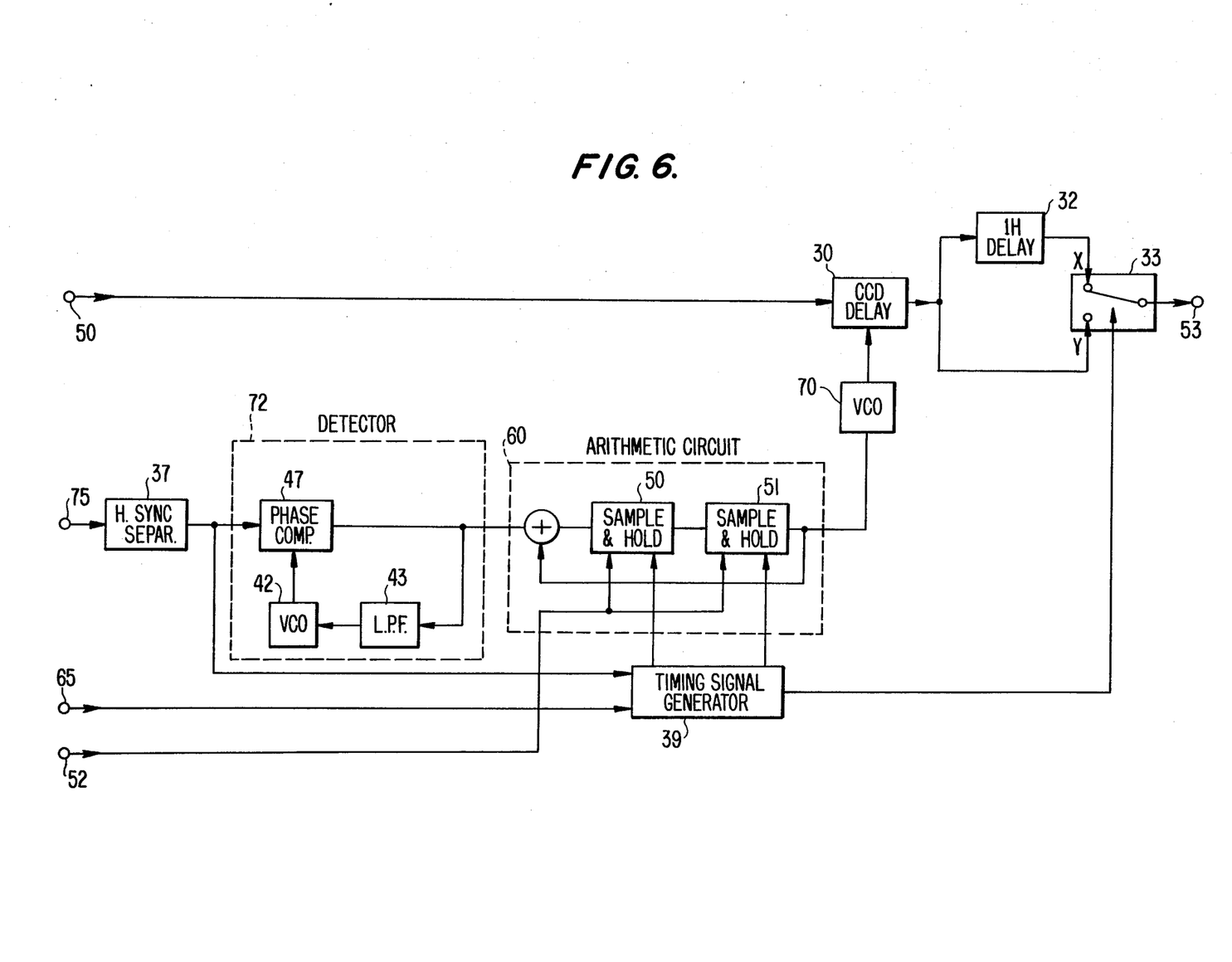
FIG. 6 is a block diagram of a skew corrector circuit that can be utilized in the present invention.
Figure 7:
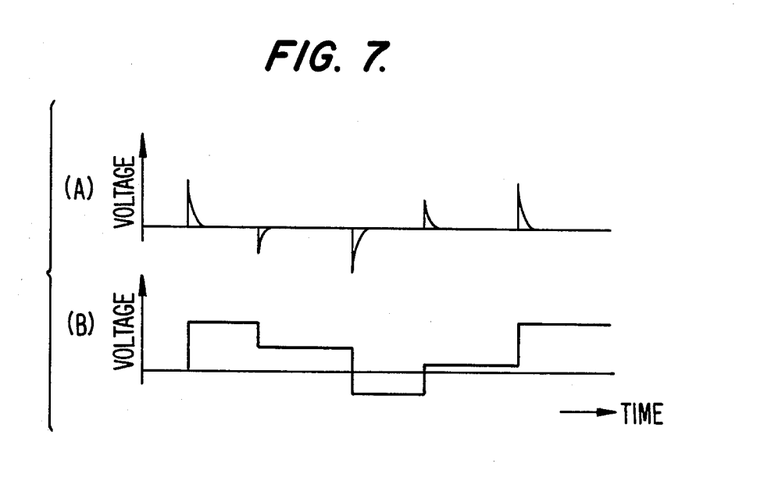
FIGS. 7(A) and 7(B) are diagrams showing the waveforms of input and output signals of an arithmetic circuit in the skew corrector circuit shown in FIG. 6.

In the foregoing embodiments, the horizontal synchronous signal for detecting the error is derived from the playback output signal before it passes through the variable delay line (the CCD delay line 30 in FIG. 6 and the tapped delay line 71 in FIG. 8). According to other embodiments shown in FIGS. 11 and 12, the horizontal synchronous signal is produced from the playback output signal having passed through the variable delay line. With these arrangements, skews are corrected through a feedback loop continuously until horizontal synchronous signal intervals of the output from the variable delay line become constant or equalized. The arrangemnt of FIG. 11 employs a CCD delay line as the variable delay line, and the arrangement of FIG. 12 uses a tapped delay line as the variable delay line.

Figure 9:
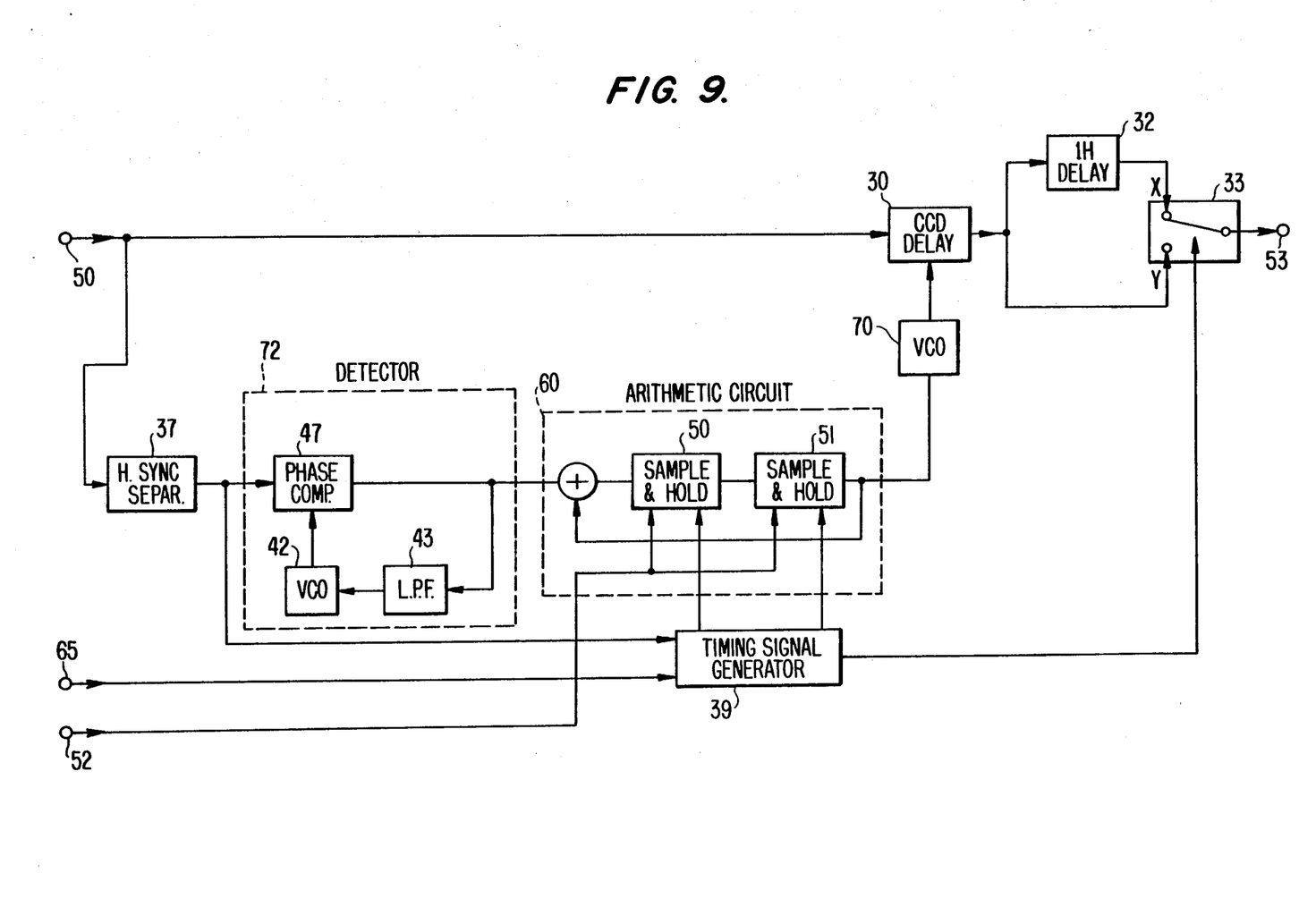
FIG. 9 is a block diagram illustrative of another arrangement the skew corrector circuit shown in FIG. 6.
Figure 10:
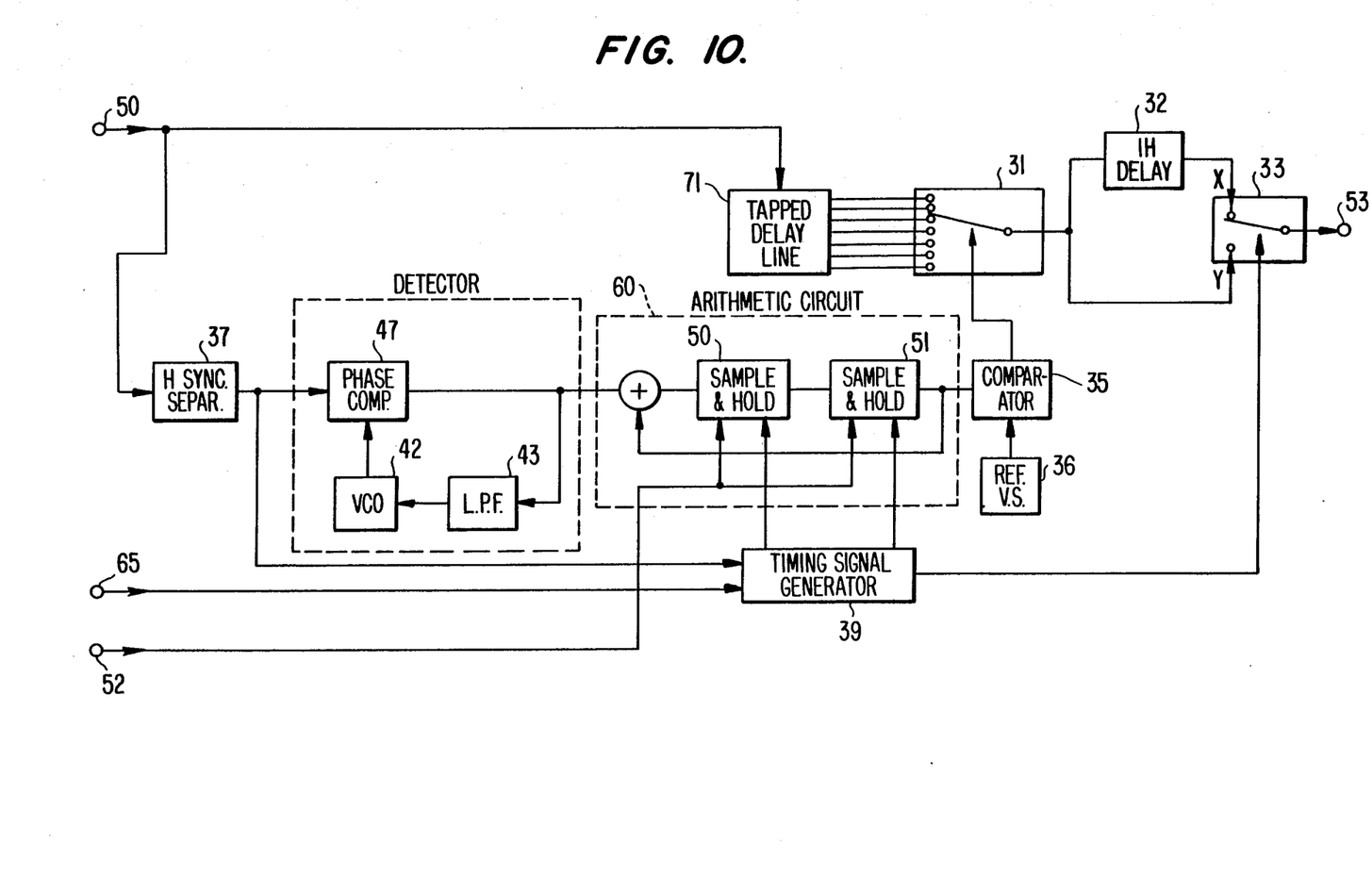
FIG. 10 is a block diagram showing another arrangement for the skew corrector circuit of FIG. 8.
Figure 11:
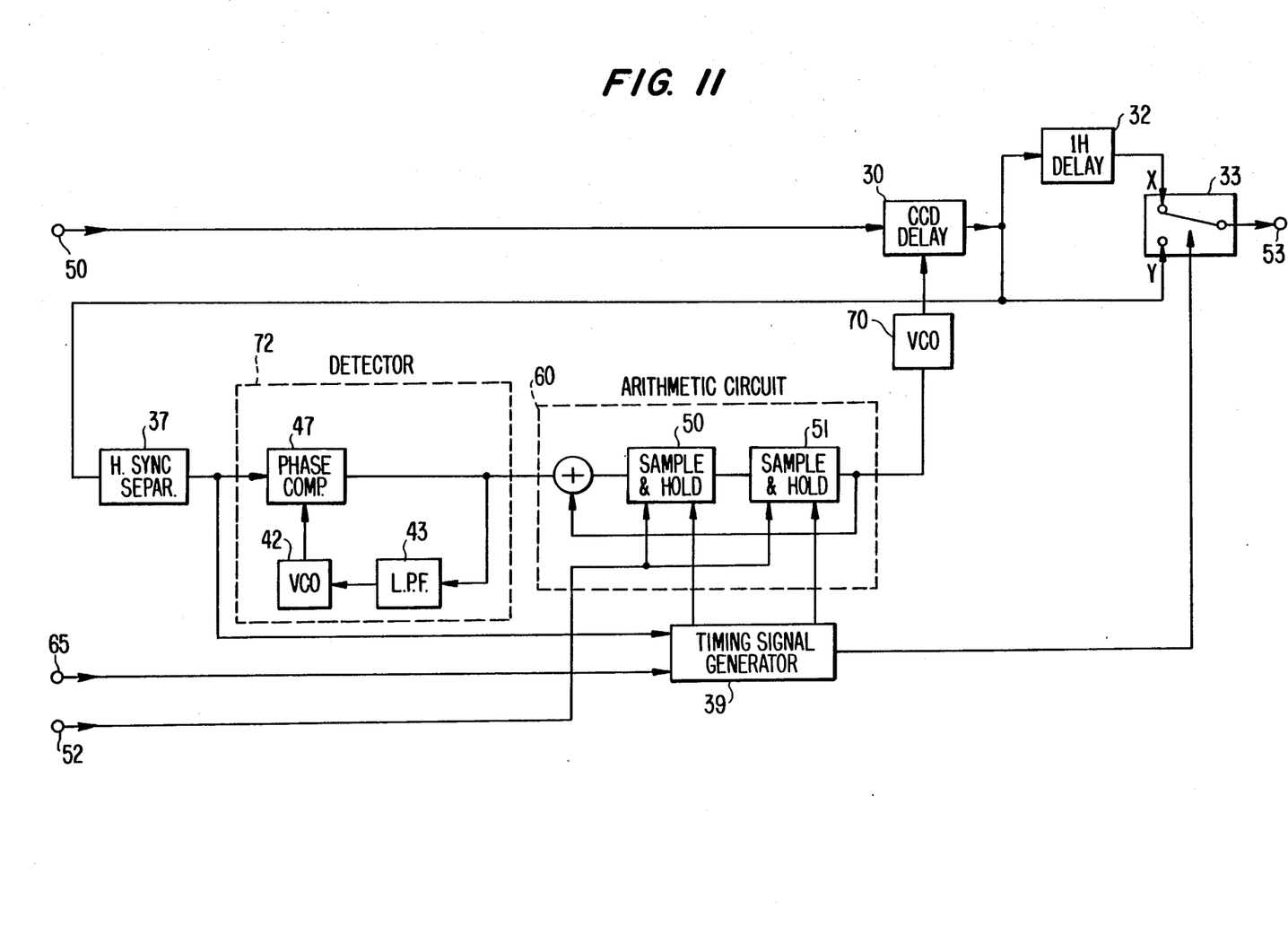
FIG. 11 is a block diagram illustrative of another arrangement for the skew corrector circuit illustrated in FIG. 6.
Figure 12:
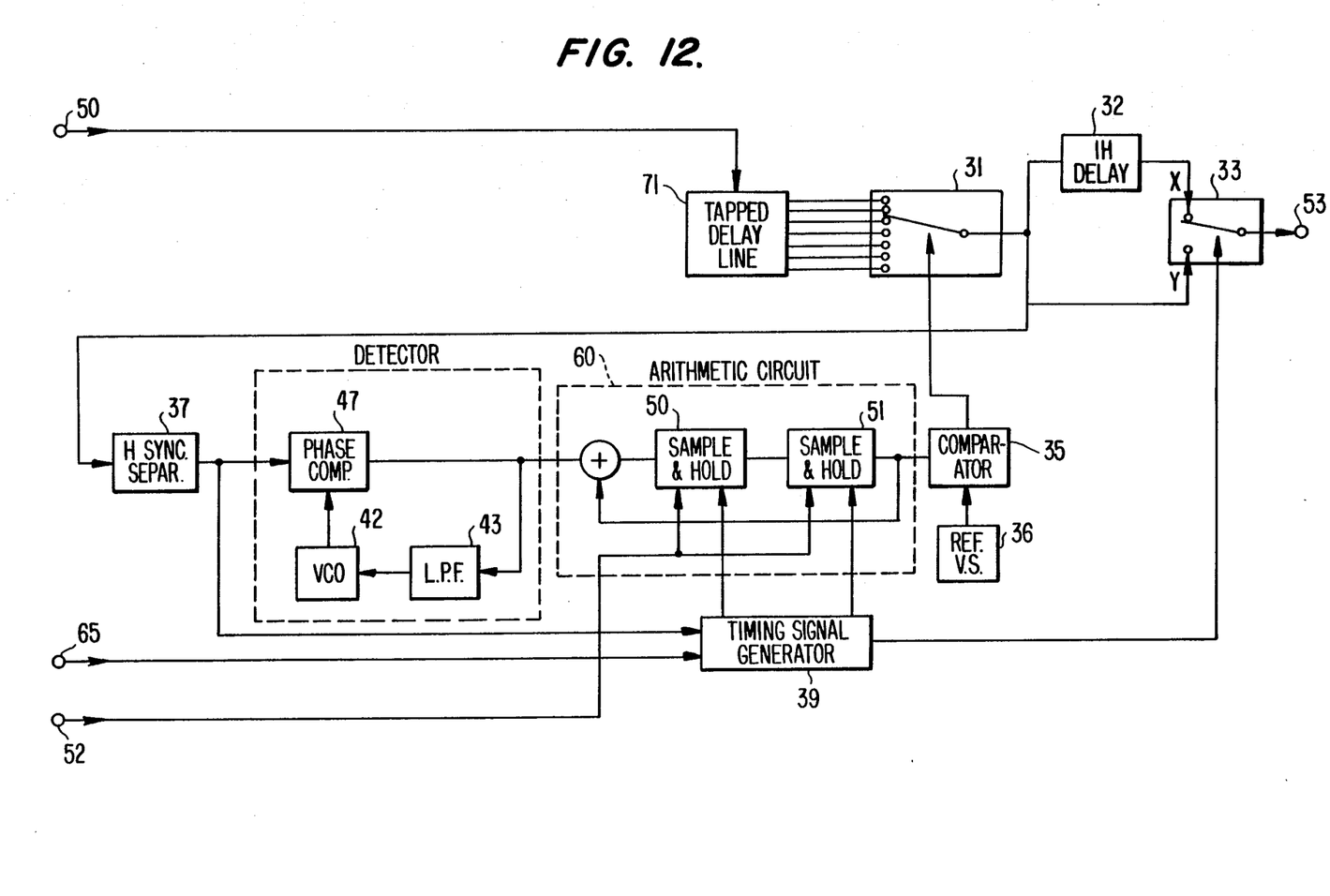
FIG. 12 is a block diagram showing another arrangement for the skew corrector circuit of FIG. 8.

Embodiments in which the horizontal synchronous signal is picked up before it passes through the variable delay line are shown in FIGS. 9 and 10. FIG. 9 illustrates a CCD delay line used as the variable delay line, and FIG. 10 a tapped delay line serving as the variable delay line. Identical or corresponding parts shown in FIGS. 9 and 11 are denoted identical or corresponding reference characters in FIG. 6. Likewise, Identical or corresponding parts shown in FIGS. 10 and 12 are denoted identical or corresponding reference characters in FIG. 8.

Although certain preferred embodiments have been shown and described, it should be understood that many changes and modifications may be made therein without departing from the scope of the appended claims.

What is claimed is:

1. A magnetic reproducing apparatus comprising:
   a pair of main rotatable heads having different azimuth angles;
   a pair of auxiliary rotatable heads having different azimuth angles and disposed at different positions from those of said main rotatable heads;
   switching timing control means for controlling timing of switching between playback output signals from said main and auxiliary rotatable heads when a magnetic tape runs in a playback mode at a speed different from that at which the magnetic tape runs in a recording mode;
   switching means responsive to an output signal of said switching timing control means for replacing a playback output signal from said main rotatable heads with a playback output signal from said auxiliary rotatable heads when the playback output signal from said main rotatable heads is reduced to thereby produce a combined playback output signal;
   a variable delay line for delaying said combined playback output signal;
   detector means for detecting a variation of a period of a reproduced horizontal synchronous signal separated from said combined playback output signal and producing an error signal indicative of said variation; and
   delay time control means responsive to said error signal from said detector means for varying a delay time of said variable delay line thereby to remove any skew generated when the playback output signals from said main rotatable heads are replaced by the playback output signals from said auxiliary rotatable heads.

2. A magnetic reproducing apparatus according to claim 1, wherein said horizontal synchronous signal is derived from the combined playback output signal before the combined playback output signal passes through said variable delay line.

3. A magnetic reproducing apparatus according to claim 1, wherein said horizontal synchronous signal is derived from the combined playback output signal after the combined playback output signal has passed through said variable delay line.

4. A magnetic tape reproducing apparatus comprising:
   a pair of main rotatable heads having different azimuth angles;
   a pair of auxiliary rotatable heads having different azimuth angles and disposed at different positions from those of said main rotatable heads;
   switching means for replacing a playback output signal from said main rotatable heads with a playback output signal from said auxiliary rotatable heads when the playback output signal from said main rotatable heads is reduced thereby to obtain a combined playback output signal;
   switching timing control means for controlling switching timing of said switching means when a magnetic tape runs in a playback mode at a speed different from that at which said magnetic tape runs in a recording mode;
   a variable delay line for delaying said combined playback output signal;
   detector means for detecting a variation of a reproduced horizontal synchronous signal separated from said combined playback output signal and producing an error signal indicative of said variation, said detector means comprising a phase comparator for comparing a phase of said horizontal synchronous signal with a phase of an output signal of a voltage-controlled oscillator which is responsive to said error signal applied thereto through a low-pass filter; and
   a delay time control means responsive to said error signal from said detector means for varying a delay time of said variable delay line;
   whereby any skew generated when the playback output signal from said main rotatable heads is replaced by the playback output signal from said auxiliary rotatable heads is removed.

5. An apparatus according to claim 4, wherein said arithmetic means comprises an adder, a first sample-and-hold circuit for holding an output signal of said adder, and a second sample-and-hold circuit for holding an output signal of said first sample-and-hold circuit to obtain an accumulated signal, said adder adding said error signal from said detector means and an output signal from said second sample-and-hold circuit.

6. A magnetic tape reproducing apparatus comprising:
- a pair of main rotatable heads having different azimuth angles;
- a pair of auxiliary rotatable heads having different azimuth angles and disposed at different positions from those of said main rotatable heads;
- switching means for replacing a playback output signal from said main rotatable heads with a playback output signal from said auxiliary rotatable heads when the playback output signal from said main rotatable heads is reduced thereby to obtain a combined playback output signal;
- switching timing control means for controlling switching timing of said switching means when a magnetic tape runs in a playback mode at a speed different from that at which said magnetic tape runs in a recording mode;
- a variable delay line for delaying said combined playback output signal;
- detector means for detecting a variation of a reproduced horizontal synchronous signal separated from said combined playback output signal and producing an error signal indicative of said variation, said detector means comprising a phase comparator for comparing a phase of said horizontal synchronous signal with a phase of an output signal of a voltage-controlled oscillator which is responsive to said error signal applied thereto through a low-pass filter;
- an arithmetic means for successively accumulating said error signal from said detector means for a vertical synchronous interval; and
- a second voltage-controlled oscillator responsive to an output signal of said arithmetic means for varying a delay time of said variable delay line;
- whereby any skew generated when the playback output signal from said main rotatable heads is replaced by the playback output signal from said auxiliary rotatable heads is removed.

7. An apparatus according to claim 6, wherein said arithmetic means comprises an adder, a first sample-and-hold circuit for holding an output signal of said adder, and a second sample-and-hold circuit for holding an output signal of said first sample-and-hold circuit to obtain an accumulated signal, said adder adding said error signal from said detector means and an output signal from said second sample-and-hold circuit.

8. An apparatus according to claim 6, wherein said variable delay line comprises a charge-coupled device delay line having a delay time variable by an oscillation frequency of said second voltage-controlled oscillator.

9. A magnetic tape reproducing apparatus comprising:
- a pair of main rotatable heads having different azimuth angles;
- a pair of auxiliary rotatable heads having different azimuth angles and disposed at different positions from those of said main rotatable heads;
- switching means for replacing a playback output signal from said main rotatable heads with a playback output signal from said auxiliary rotatable heads when the playback output signal from said main rotatable heads is reduced thereby to obtain a combined playback output signal;
- switching timing control means for controlling switching timing of said switching means when a magnetic tape runs in a playback mode at a speed different from that at which said magnetic tape runs in a recording mode;
- a variable delay line for delaying said combined playback output signal;
- detector means for detecting a variation of a reproduced horizontal synchronous signal separated from said combined playback output signal and producing an error signal indicative of said variation, said detector means comprising a phase comparator for comparing a phase of said horizontal synchronous signal with a phase of an output signal of a voltage-controlled oscillator which is responsive to said error signal applied thereto through a low-pass filter;
- an arithmetic means for successively accumulating said error signal from said detector means for vertical synchronous interval; and
- a voltage comparator comparing an output signal of said arithmetic means with a reference voltage for varying a delay time of said variable delay line;
- whereby any skew generated when the playback output signal from said main rotatable heads is replaced by the playback output signal from said auxiliary rotatable heads is removed.

10. An apparatus according to claim 9, wherein said arithmetic means comprises an adder, a first sample-and-hold circuit for holding an output signal of said adder, and a second sample-and-hold circuit for holding an output signal of said first sample-and-hold circuit to obtain an accumulated signal, said adder adding said error signal from said detector means and an output signal from said second sample-and-hold circuit.

11. An apparatus according to claim 9, wherein said variable delay line comprises a tapped delay line having taps switchable by an output signal of said voltage comparator.

* * * * *